July 22, 1969  H. A. ELLENBERGER  3,456,912
SEAT OR BED SUPPORT
Filed Oct. 17, 1966  3 Sheets-Sheet 1
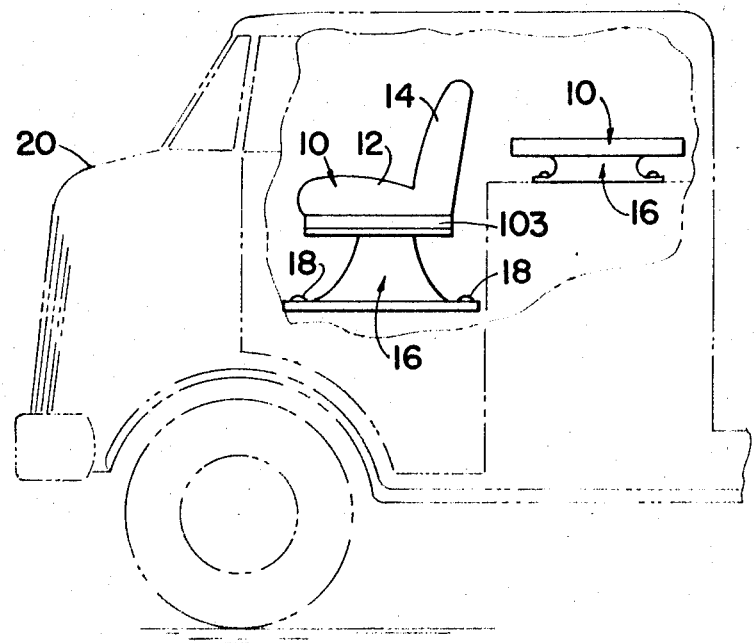
FIG. 1
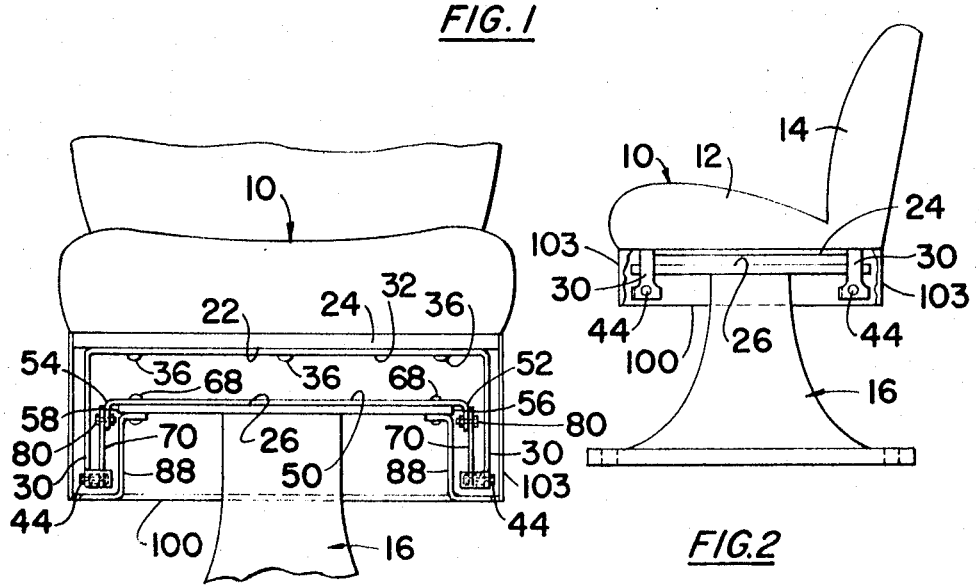
FIG. 3
FIG. 2
INVENTOR
Howard A. Ellenberger
BY Wood, Gust & Irish
ATTORNEYS July 22, 1969  H. A. ELLENBERGER  3,456,912
SEAT OR BED SUPPORT
Filed Oct. 17, 1966  3 Sheets-Sheet 2
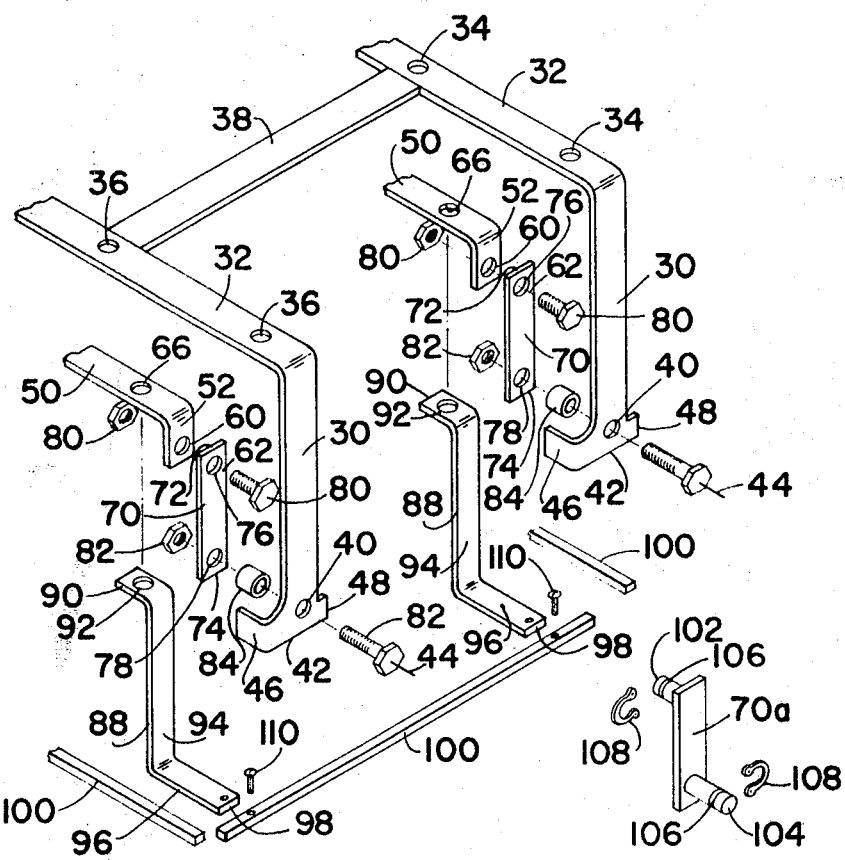
FIG. 4
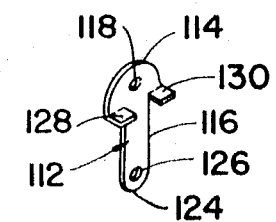
FIG. 5
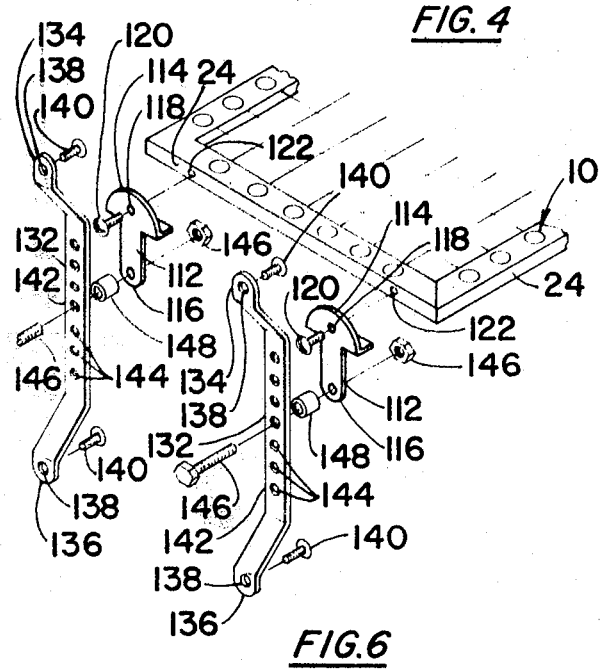
FIG. 6
FIG. 6a
INVENTOR
Howard A. Ellenberger
BY Hood, Gust & Irish
ATTORNEYS

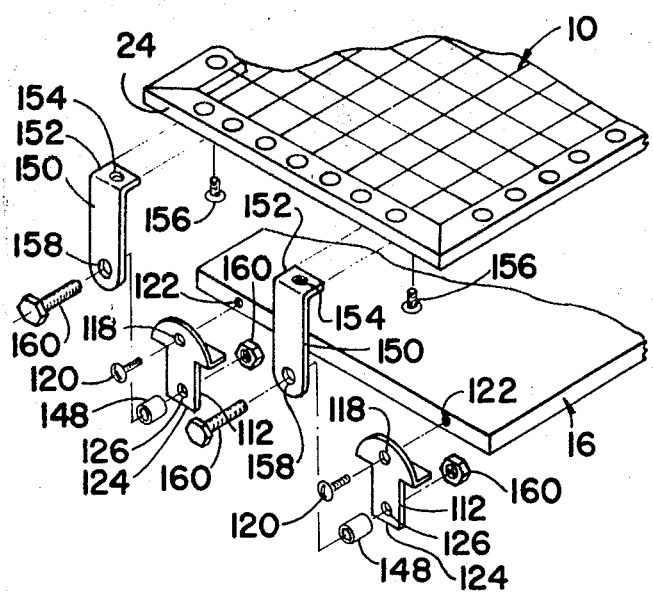

── ── ── ──

United States Patent Office 3,456,912
Patented July 22, 1969

1

3,456,912
SEAT OR BED SUPPORT
Howard A. Ellenberger, 6802 Baer Road,
Fort Wayne, Ind. 46807
Filed Oct. 17, 1966, Ser. No. 587,088
Int. Cl. F16m 13/02
U.S. Cl. 248—424         6 Claims

ABSTRACT OF THE DISCLOSURE

A support, in a specific embodiment for supporting a vehicle seat or bed assembly, comprising a pair of members connected together, one of said members being connected to a vehicle, the other of said members being connected to the vehicle seat or bed assembly. The members are allowed to move relative to each other in a direction fore and aft of the vehicle. The members have an at-rest position from which the vehicle seat or bed assembly will move against gravitational restraint. Means is provided for limiting the motion of the members of the device between predetermined limits.

────

The present invention generally relates to a vehicle seat or bed support, and more particularly, it relates to a support for vehicle seats of all kinds and for beds such as those conventionally used in "sleeper cabs" of trucks which allows the seat or bed to move with respect to the vehicle or device on which it is mounted in a manner which absorbs the shock of the impacts resulting from normal usage.

Prior art devices have been proposed which allows a vehicle seat to move in the fore and aft direction with respect to the vehicle against the urging of a resilient member, for example a spring or rubber bumper. Some of these devices have been incorporated in the mechanism for adjusting the position of the seat with respect to the vehicle as is conventional in most vehicles. The deficiencies and difficulties encountered with prior art devices are many. Those which employ resilient members, such as springs, rubber bumpers, and the like, have been plagued with breakage or loss of resiliency of the resilient member. Breakage of the resilient member in some devices allows the vehicle seat to move farther than desired such that the breakage of the resilient member of the seat may prove dangerous in the operation of the vehicle. Still other prior art devices are defective from the standpoint that the mechanism utilized is very complex and proportionately expensive to manufacture. This is especially so of devices which are provided in combination with the means for adjusting the location of the vehicle seat.

Conventionally, vehicles are provided with seats which are rigidly mounted to the vehicle. Such seats can become extremely uncomfortable when occupied for relatively long lengths of time and when provided on vehicles which are relatively rigidly sprung, for example, bulldozers, tractors, truck, and the like. The same can be said for bunks such as those provided in "sleeper cabs." Even in relatively softly sprung vehicles, such as passenger cars, additional comfort can be derived from the provision of a seat support allowing fore and aft motion of the seat with respect to the vehicle. While this difficulty of providing comfort to both the operator and passengers of vehicles, especially those vehicles which are rigidly sprung, has been known for some time, none of the prior art devices are being widely used. One consensus of opinion is that the cost of the prior devices is too high for wide-spread use. For these reasons, it is highly desirable to provide an improved support for a vehicle seat or bed which can be inexpensively manufactured and provided, either as original equipment or in a kit which can be easily assembled to modify original equipment, for the purpose of improving comfort of such seats and beds.

It is therefore the primary object of this invention to provide a relatively simple seat or bed support which can be manufactured inexpensively and provided either as original equipment or in kit form for modifying original equipment.

Another object of this invention is to provide an improved vehicle seat or bed support which allows the vehicle seat or bed to move with respect to the vehicle and does not use resilient members, for example, springs, rubber bumpers, and the like, which may become defective during use.

Yet another object of this invention is to provide an improved vehicle seat and bed support which supports the seat or bed by hanging the seat or bed from a rigid structure whereby the seat or bed can move fore and aft of the vehicle against gravitational restraint, but cannot move transversely of the fore and aft direction of said vehicle.

A further object of this invention is to provide an improved vehicle seat and bed support which allows the seat or bed to move fore and aft of said vehicle a relatively small distance against the gravitational restraint of the seat or bed in response to the impacts normally encountered during the operation of the vehicle and which includes no structural members which flex during operation.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a fragmentary and break-away side view of a conventional truck "sleeper cab" showing both a seat and a bed of the type conventionally mounted on a pedestal rigidly secured to the cab, mounted in accordance with this invention;

FIG. 2 is a side view of the seat illustrated in FIG. 1 having a portion of the upholstery broken away so as to show the structure of the support of this invention;

FIG. 3 is a fragmentary front view of the seat illustrated in FIG. 2 having a portion of the upholstery broken away such that the structure of the support of this invention is visible;

FIG. 4 is a fragmentary, exploded and perspective view of the structure of the seat and bed support of this invention;

FIG. 5 is a perspective view of a second embodiment of the pivotal linkage illustrated in FIG. 4 which connects the structure of the support of this invention rigidly secured to a vehicle seat or bed to that structure rigidly secured to the vehicle;

FIG. 5A is a perspective view similar to FIG. 5 of a third embodiment of the linkage illustrated in FIG. 4 which connects the structure of the support of this invention rigidly secured to a vehicle seat or bed to that structure rigidly secured to the vehicle;

FIG. 6 is a perspective, fragmentary and exploded view of a second embodiment of the support of this invention which utilizes members which are pivotally connected to the seat or bed;

FIG. 6A is an enlarged perspective view of the pivotal linkage illustrated in FIG. 6 which connects the structure of the support of this invention rigidly secured to a vehicle seat or bed to that structure rigidly secured to the vehicle;

FIG. 7 is a perspective and fragmentary view of a third embodiment of a support of this invention which is similar to that illustrated in FIG. 6, but which utilizes members which are rigidly secured to the seat or bed;

FIG. 8 is a fragmentary side view of the seat illustrated in FIG. 1 showing a fourth embodiment of the support of this invention; and FIG. 9 is a perspective and exploded view of the embodiment of the support of this invention illustrated in FIG. 8.

In the broader aspects of this invention there is provided a vehicle seat and bed support having a device for mounting a seat or bed to a vehicle which allows the seat or bed to move fore and aft of said vehicle. The support includes means for limiting the motion of the seat or bed and vehicle between predetermined limits and for providing an at rest position from which the seat or bed will move upon being subjected to the impacts such as those normally encountered during the use of a vehicle.

Referring to the drawings, and more specifically to FIGS. 1 through 4, there is shown a vehicle seat mounted by means of the vehicle seat or bed support of this invention. The vehicle seat comprises generally an upholstered seat 10 having a seat portion 12 and a back portion 14, which is mounted on a pedestal 16 conventionally, rigidly secured by bolts 18 to the floor of the cab or vehicle 20. Both the seat 10 and the pedestal 16 are conventional. Any seat or bed or pedestal 16 can be utilized with the structure of this invention as hereinafter described so long as the seat or bed has a rigid bottom surface 22 or outwardly facing peripheral edges 24 by which the structure of this invention can be secured to the seat or bed and the pedestal 16 has an upwardly facing rigid surface 26 on which the structure of this invention can be supported. The surface 26 of the pedestal 16 is shown in the drawings to be the upwardly facing surface of a rigid sheet of metal, wood, or a like material, rigidly fastened to the pedestal 16. However, obviously within the scope of this invention are slight modifications to the structure disclosed therein for mounting the support of this invention to the pedestal 16 or a like structure.

The support of this invention comprises four members 30 which are rigidly secured to the bottom 22 of the seat 10 by means of interconnecting members 32 having openings 34 therein through which bolts 36, which are secured to the seat bottom 22, are positioned. For increased rigidity, members 32 are interconnected by bracing member 38. Secured to the seat bottom 22 in this manner, members 30 depend from the heat 10 adjacent to the four corners of the seat and the peripheral edges 24 thereof. Each member 30 has an opening 40 therein which is spaced apart from the seat bottom 22 and adjacent to the distal ends 42 of the members 30. Openings 40 have an axis 44 and the members 30 are positioned with respect to the seat such that the axes 44 extend in the side to side direction of the seat. On both sides of the openings 40 and adjacent to the distal ends 42, there are provided two ears or stops 46 and 48. Ears 46 and 48 extend inwardly toward the seat 10 from the members 30 in the direction of the axis 44. Ears 46 and 48 are generally parallel to the axis 44.

Secured to the top surface 26 of the pedestal 16 are members 50. Members 50 extend from side to side of the seat 10 and over the entire top surface 26 of the pedestal 16. Adjacent opposite ends of the members 50 there are ears 52 and 54 which depend downwardly from the pedestal 16 a short distance to cover a portion of the side edges 56, 48 of the pedestal 16 as shown in FIGS. 2 and 3. Each of the ears 52 and 54 have an opening 60 therein. Opening 60 has an axis 62 which is parallel to the axis 44 aforementioned. The members 50 are secured to the pedestal 16 by means of openings 66 therein through which bolts 68 are positioned and secured to the pedestal 16. Four elongated links 70 having opposite ends 72 and 74 are provided for interconnecting the members 30 and the members 50. Links 70 have adjacent ends 72 and 74 openings 76 and 78. The members 30 and 50 are connected by positioning the openings 76 in registry with the openings 60 and interconnecting the link 70 to the members 50 by means of a bolt 80; and positioning the opening 78 in registry with the opening 40 and interconnecting the link 70 to member 30 by means of bolt 82. Between the link 70 and the member 30 there is provided a spacer 84. The spacer 84 merely functions to space apart the members 30 from the link 70 a distance so as to accommodate the head of the bolt 80. Thus assembled, the link 70 is positioned between the ears 46 and 48 of the member 30, and the link 70 is free to rotate about the axes 44 and 62 between the engagement of the link 79 with the ears 46 and 48.

Further, the four members 88 are provided to be secured to the pedestal 16 by the bolts 68, which also secure the members 50 to the pedestal 16. Members 88 have ears 90 which are provided with an opening 92 through which the bolts 68 can be positioned. Members 88 have a portion 94 which depends from the pedestal 16 and a portion 96 which extends outwardly of the pedestal 16 terminating directly beneath the peripheral boundaries of seat 10. Secured to the distal ends 98 of the portions 96 and the members 88 is a member 100 which is made of a material which will receive staples, tacks and the like, and hold them. As shown in FIGS. 2 and 3, member 100 extends around the entire peripheral boundary of the seat 10. Secured to the member 100, by conventional techniques, is an elastic upholstery material 103. Upholstery material 103 extends from the member 100 upwardly to the peripheral boundaries 24 of the seat 10 so as to cover and hide from view the structure of the support of this invention.

Referring now to FIG. 5, there is shown a link 70a which can be substituted in the structure illustrated in FIGS. 2, 3 and 4 for the link 70, whereby the bolts 80 and 82 and the spacer 84 can be eliminated. Link 70a has, in place of the openings 76 and 78, cylindrical rod portions 102 and 104. Rod portions 102 and 104 extend outwardly from the link 70a perpendicularly therewith such that the rod portions 102 and 104 can be positioned on the axes 62 and 44 of the device above-described, and positioned in the openings 40 and 60 of the members 30 and 50, respectively. By positioning the rod members 102 and 104 in the openings 40 and 60 and securing the rod portions therein, the link 70a will function in the same manner as the link 70 aforedescribed. The securance of the rod portions 102 and 104 in the openings 40 and 60, respectively, is achieved by providing each of the rod portions 102 and 104 with annular grooves 106 therein at a position spaced apart from the link 70a. The spacing of the grooves 106 from the link 70a should be a distance sufficient to position the grooves 106 on the sides of the members 30 and 50 opposite that adjacent to the link 70a. With the grooves 106 so positioned, C-shaped clips 108 can be positioned within the grooves. Clips 108 being larger than the openings 40 and 60, rod portions 102 and 104 are secured within the openings 40 and 60.

Referring now to FIG. 5A, there is shown a link 70b which can be substituted in the structure illustrated in FIGS. 2, 3 and 4 for the link 70 to allow the seat or bed also to move in a side to side direction in a manner similar to the motion in the force and aft direction. Link 70b has, in place of the openings 76 and 78, balls 200 in spaced apart relation to the link 70b by shanks 202. When the link 70b is used, members 30 and 50 respectively have sockets 204 adapted to receive balls 200 instead of openings 40 and 60. By link 70b, the seat or bed 10 is swivelly connected to the vehicle 20; and thus, the seat or bed 10 can move in the side to side direction as well as the fore and aft direction above described. However, the movement is limited by the engagement of the link 70b with the ears 46, 48 above-mentioned or by the engagement of the shanks 202 with the sockets 204. The link 70b is especially desirable for use with seats of tractors, bulldozers, and like vehicles which have substantial side to side movement during use.

In a specific embodiment of the support afore-described, each of the members 30, 32, 38, 50, 88 and links 70, 70a, 70b are made of steel of sufficient thickness to provide a strength such that the members will not be deformed during use. Otherwise the bolts 80, 82 and the spacers 84 are all conventional. The member 100 can be made of wood, plastic, or the like. The connection of the steel members can be made by welding, brazing, and the like, or if desired, each piece which is integral when fully assembled can be integrally formed as by a stamping, and then bent into the desired shape. The interconnection of the member 100 to the members 88 can be made by adhesively connecting members 100 together and securing them by conventional cotter pins 110 as shown in FIG. 4.

Referring now to FIGS. 6 and 6A, there is shown another embodiment of the support of this invention. This embodiment, like the first embodiment illustrated in FIGS. 1 through 5, functions to mount a seat or bed 10 to a vehicle 20. This second embodiment however mounts the seat or bed 10 without the use of a pedestal 16 as afore-described. The seat or bed 10 has a peripheral edge 24 to which four members 112 are pivotally secured. Members 112 have opposite end portions 114 and 116. End portion 114 has an opening 118 therein in which a bolt 120 is positioned. Bolt 120 is threadedly secured to a peripheral edge 24 of the seat or bed 10 by means of a threaded opening 122 therein so as to pivotally connect the member 112 to the seat or bed 10. End portion 116 is elongated and depends from the portion 114 when the member 112 is secured as above-described. Adjacent to the distal end 124 of the portion 116 there is provided an opening 126. Intermediate the portions 114 and 116 of the member 112 there are provided two ears or stops 128 and 130 which extend from the portion 114 on opposite sides of the member 116 so as to be positioned adjacent to and directly beneath the seat or bed 10. Mounted as afore-described, the member 112 is free to swing about the axis of the bolt 120 between the engagement of the ears 128 and 130 with the seat or bed 10.

Secured to the inside wall surface of the cab of the vehicle 20 is a bracket 132. Bracket 132 has opposite end portions 134 and 136 in which openings 138 are provided for positioning bolts 140 which mount the bracket 132 to the vehicle 20. The bracket 132 has a central portion 142, which, when the bracket 132 is mounted as afore-described, is spaced apart from the vehicle 20. The portion 142 is elongated and has a vertical row of openings 144 extending between the opposite ends 134, 136. The bracket 132 is pivotally connected to the member 112 by means of a bolt 146 which is positioned in one of the openings 144 depending the desired height of the seat or bed 10 and in the opening 116. To provide clearance for the bolt 120 between the bracket 132 and the member 112, a spacer 148 is provided.

Referring now to FIG. 7, there is shown a third embodiment of the support of this invention which is similar to the second embodiment illustrated in FIG. 6. The embodiment of FIG. 7 provides a support for mounting a seat or bed 10 to a pedestal 16. Members 112 are pivotally secured in the manner above-described to a peripheral edge of the pedestal 16. Rigidly secured to the seat or bed 10 adjacent to the peripheral edge 24 are two members 150. Members 150 have an ear portion 152 with an opening 154 therein in which bolts 156 are positioned to secure the members 150 to the seat or bed 10. Members 150, thus secured, depend from the seat or bed 10 downwardly. At a position spaced apart from the seat or bed 10, members 150 have openings 158 therein. Bolts 160 are provided in the openings 158 and 126 so as to pivotally connect the members 150 to the members 112. A spacer 148 is provided to provide clearance between the members 150 and 112 for the bolts 120 as was provided in the second embodiment illustrated in FIG. 6. The structure of this third embodiment can also be hidden from view by upholstery material 103, mounted to pedestal 16 as above-described, if desired.

Referring now to FIGS. 8 and 9, a fourth embodiment of the support of this invention is illustrated. This fourth embodiment has a pair of members 162 each of which has a central portion 164 and opposite end portions 166 and 168. Portion 164 is rigidly secured to the bottom 22 of the seat 10 by openings 170 in which bolts (not shown) are positioned and secured to the seat 10. Thus secured to the seat 10, portions 166 and 168 of the member 162 depend downwardly and outwardly of the seat 10. Each of the portions 166 and 168 have distal end portions 172 to which rollers 174 are attached. Rollers 174 are positioned so as to be rotatable about axes 176 which extend in a side to side direction of the seat 10. Secured to the opposite side peripheral edges 56 of the pedestal 16 are oppositely disposed allochiral members 180. Members 180 upstand from the surface 26 of the pedestal 16 and have oppositely facing recesses 182 therein. Each member 180 has two recesses 182 positioned adjacent to the front and rear of the seat 10, respectively. Each recess 182 faces inwardly of the seat 10 and has a flat bottom 184, upstanding sides 186 and 188, and opposite ends 190 and 192. Recess bottoms 184 define planes which extend vertically and fore and aft of the vehicle 20 when the seat is appropriately mounted. Both the sides 186 and 188 and the ends 190 and 192 extend inwardly toward the pedestal 16 from the bottom 184.

Referring to a single member 180, the two recesses 182 of that member have the bottoms 184 thereof lying in the same plane, and the sides 186 and 188 also lying in a common plane. The planes of the sides 186 and 188 slope upwardly from the leading edge 194 of the pedestal 16 toward the trailing edge 196 thereof. Thus, the recess 182 positioned adjacent to the leading edge 194 is lower than the recess 182 adjacent to the trailing edge 196. However, both recesses 182 are positioned so as to slope in the same direction and at the same angle with the horizontal.

When the structure of this invention is assembled, the rollers 174 are positioned in the recesses 182. The peripheral portion of the rollers 174 engage the opposite sides 186 and 188 of the recesses 182. Further, the bottoms 184 of the recesses facing each other and in which the rollers 174 of the same member 162 are positioned are spaced apart a distance slightly larger than the rollers 174 such that the rollers 174 cannot be removed from the recesses 182 without deforming either the member 162 or the members 180. The recesses 182 are elongated in the direction of their slope so as to be longer than the dimension of the rollers 174 measured in the same direction and to allow the rollers 174 to move between the opposite ends 190 and 192.

In a specific construction of each of the second, third and fourth embodiments of the invention above-described, each of the members 112, 132, 150 and 180 are preferably made of metal. Further, these same members are provided with a strength and rigidity such that during use of the support of this invention they will not be deformed or flexed.

Each of the embodiments of this invention mount a seat or bed to a vehicle 20 in a manner by which the seat or bed is allowed to move fore and aft of the vehicle 20. Further, each of the embodiments has an at rest position from which the seat or bed 10 will move in response to the impacts normally encountered during use of the vehicle 20. The movement of the seat or bed 10 is restrained by the fact that during such movement, the seat or bed 10 is elevated. Thus, the gravitational forces urge the seat or bed 10 into its at rest position. Further, each of the embodiments of this invention has means by which the movement of the seat or bed 10 is limited so that if the movement overcomes the gravitational restraint, the seat or bed 10 will be positively stopped so as not to create a safety hazard to the person on the seat or bed 10.

The movement of the seat or bed 10 allowed by the support of this invention cushions the impacts normally experienced in the operation of the vehicle 20. The comfort to the person on the seat or bed 10 is thus improved over the same seat or bed 10 mounted rigidly to the vehicle 20 as is conventional. This additional comfort is supplied by the support of this invention which is both relatively simple in construction and inexpensive to manufacture.

While there have been described above the principles of this invention in connection with specific apparatus, it is to be clearly understood that this description is made only by way of example and not as a limitation to the scope of the invention.

What is claimed is:

1. A support for mounting an assembly on a vehicle or a like device comprising a first member and a second member, said first and second members being connected together by first means for permitting swivel movement between said first and second members, said first and second members having an at-rest position from which said first and second members will move relative to each other both in a fore and aft direction and in a side to side direction against gravitational restraint upon being urged therefrom, and second means for limiting the motion between said first and second members to motion between predetermined limits, said at-rest position being between said predetermined limits.

2. The support of claim 1 wherein said first means comprises a connecting member having opposite ends, means adjacent both of said connecting member ends for respectively connecting said member ends to said first and second members, said last-mentioned means allowing swivel movement between both said first and second members and said connecting member.

3. The support of claim 1 further comprising an assembly and an assembly mounting device, and wherein said first member is connected to said assembly, said second member being connected to said mounting device, said first member depending from said assembly, said second member depending from said mounting device, the connection of said first member to said second member being beneath the respective connections of said first and second members to said assembly and mounting device.

4. The support of claim 3 wherein said first member is rigidly secured to said assembly, and further comprising means for permitting movement between said second member and said mounting device.

5. An assembly and a support for mounting the same on a vehicle or a like device comprising a first member and a second member, said first and second members being connected together by first means for permitting movement between said first member and said second member, said first and second members having an at-rest position from which said first and second members will move relative to each other against gravitational restraint upon being urged therefrom, and second means including ears mounted on said first member on opposite sides of said at-rest position for engaging said first means and limiting the motion between said first and second members to motion between said ears, said gravitational restraint increasing as said members move between said ears and away from said at-rest position, an assembly and an assembly mounting device, said mounting device being rigid in directions transverse to a vertical direction, and wherein said first member is connected to said assembly, said second member being connected to said mounting device, said first member depending from said assembly, said first means depending from said second member, the connection of said first member to said second member by said first means being beneath the respective connections of said first and second members to said assembly and mounting device.

6. The support of claim 5 wherein said first means comprises a connecting member having opposite ends, means adjacent both of said connecting member ends for respectively connecting said member ends to said first and second members, said last-mentioned means allowing movement between both said first and second members and said connecting member.

References Cited

UNITED STATES PATENTS

| | | | |
|---|---|---|---|
| 226,053 | 3/1880 | Finnegan | 248—421 XR |
| 907,733 | 12/1908 | Burke | 248—424 XR |
| 2,283,000 | 5/1942 | Feldman | 5—129 |
| 2,718,916 | 9/1955 | Borochoff | 5—129 XR |
| 3,319,920 | 5/1967 | Freedman et al. | 248—399 |

FRANCIS K. ZUGEL, Primary Examiner

U.S. Cl. X.R.

297—344